Jan. 8, 1935.  A. VON WANGENHEIM  1,987,277
LUBRICATING MEANS
Filed April 21, 1931
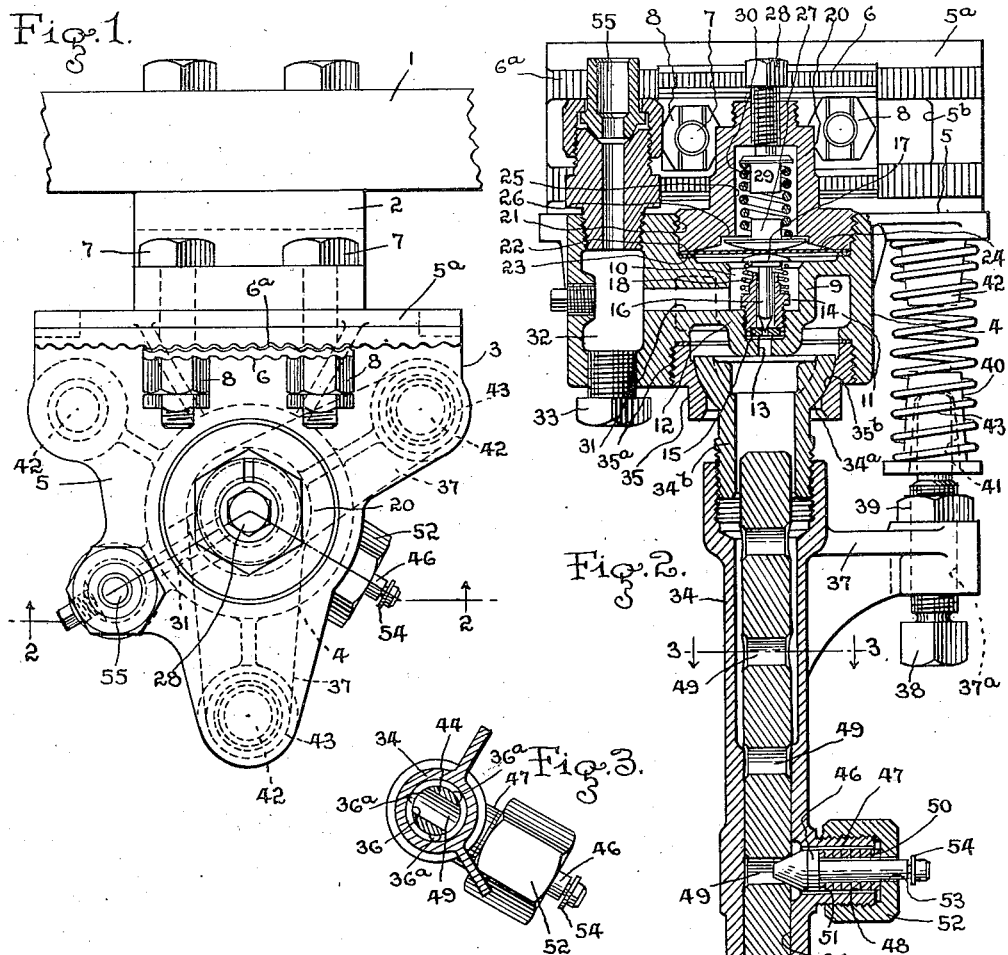
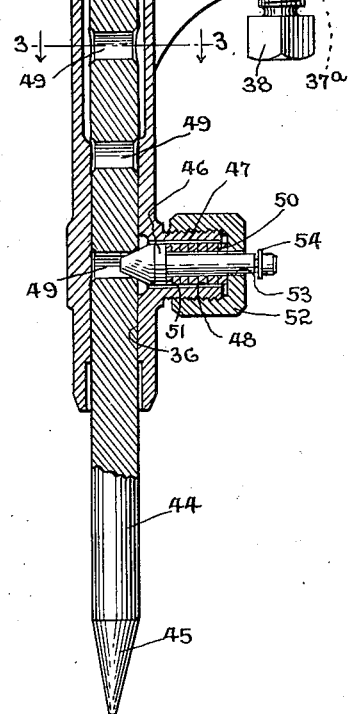
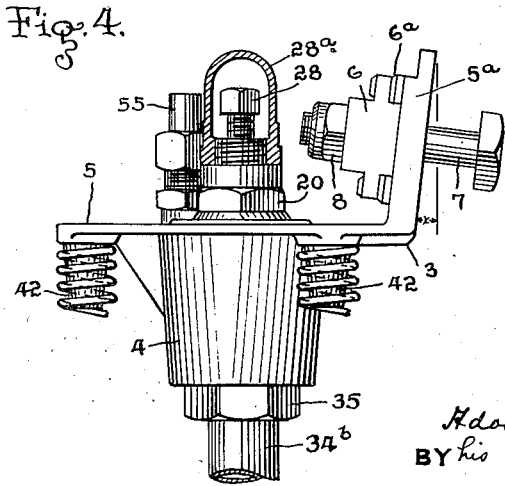
Adolf von Wangenheim INVENTOR
BY his ATTORNEY Patented Jan. 8, 1935

1,987,277

UNITED STATES PATENT OFFICE 1,987,277

LUBRICATING MEANS

Adolf von Wangenheim, Detroit, Mich., assignor to Detroit Lubricator Company, Detroit, Mich., a corporation of Michigan Application April 21, 1931, Serial No. 531,657

8 Claims. (Cl. 184—3)

My invention relates to new and useful improvements in lubricating means, and more particularly to a device for supplying lubricant to a surface to be lubricated, such, for example, as a flange of a locomotive driving wheel, or the like.

An object of my invention is to provide a device which will supply lubricant efficiently to a wheel flange without danger of lubricant reaching the wheel tread or traction surface.

Another object is to provide a lubricant feeding device having means to control the pressure at which lubricant will be discharged therefrom.

Another object is to provide a device which may be employed to lubricate the flange either forwardly or rearwardly of the wheel axle, and which is also operable whether the flange is at the right or the left of the traction face of the wheel.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1 is a top plan view of the device of my invention;

Fig. 2 is a view in vertical section on the line 2—2 of Fig. 1;

Fig. 3 is a view in horizontal section on the line 3—3 of Fig. 2, and

Fig. 4 is a detail view in elevation looking from right to left of Fig. 1, with the cap of an adjusting screw in place and in vertical section.

Referring to the drawing by characters of reference, 1 designates a portion of an engine frame, or the like, to which is rigidly secured a bracket member 2. Adjustably secured to the member 2 is a supporting member 3 carrying a hollow casing or housing member 4 having an internal chamber. The member 3 has a substantially horizontal platform or plate portion 5 from which the member 4 depends substantially centrally, and has an upward extending back portion 5ª with a substantially horizontal, elongated aperture 5ᵇ therethrough. The portion 5ª is at an angle $x$ to the vertical, preferably three degrees. Cooperable with the portion 5ª is a clamping plate 6, the portion 5ª and plate 6 preferably having cooperating toothed racks 6ª. Extending through the bracket 2, aperture 5ᵇ and plate 6, are bolts 7 having nuts 8 engaging plate 6 to clamp member 3 in position. Within the member 4 is a partition member 9 dividing the hollow interior or chamber of member 4 into inlet and outlet compartments 10, 11, respectively. The partition member 9 has a substantially horizontal portion 12 through which is a transverse passage 13 which is of enlarged internal diameter and internally threaded at its upper end to receive a valve guide member 14 having a longitudinal bore and carrying a ported valve seat member 15. Cooperating with member 15 to control the passage 13, is a valve member 16, the stem of which is preferably polygonal in cross-section to permit flow around the stem and through the bore of member 14. The stem of valve member 16 terminates in a head or annular flange 17, preferably slightly convex on its upper face. Positioned between the head 17 and a circumferential flange on member 14, is a resilient means 18, preferably a coil spring under compression and normally acting to urge the valve member 16 toward open position. The top wall of member 3 is preferably formed by a plug or cap member 20 threaded into the member 3, as at 21, and having a marginal rim portion 22 on its under face cooperable with an annular, upward facing shoulder or seat 23 substantially concentric with passage 13 and in the compartment 10. Clamped and sealed at its marginal edge between rim portion 22 and seat 23, is a metal diaphragm 24 which engages the head 17 and seals the open side of the inlet compartment. In the cap member 20 is a chamber 25 concentric with passage 13, and which is enlarged, as at 26, to receive a spring follower member 27 having a slightly convex under face which bears against the top face of the diaphragm 24. Through the top wall of the cap member 20 concentric with passage 13, is an adjusting screw 28 having a cap or cover member 28ª. Against screw 28 is seated an abutment member 29 for a spring means 30 which is held under compression thereby against the follower member 27. The means 30 which is preferably a coil spring is stronger than spring 18 and normally acts through the diaphragm to seat the valve 16. An inlet passage 31 is provided for compartment 10 and preferably has intermediate its length a sump or dirt collecting chamber 32 with a drain plug 33.

Supported by and depending from the member 3 is a nozzle or feed pipe member 34 having at its upper end a circumferential downward facing convex surface 34ª. The bottom wall of casing member 3 is formed by a sleeve member 35 threaded, as at 35ª, into the member 3 and having an internal upward facing concave annular surface or shoulder 35ᵇ cooperating with and conforming to the surface 34ª to provide a tight universal joint. The surface 34ª is preferably formed on a hollow fitting member 34ᵇ threaded into the upper end of the member 34 which is of enlarged internal diameter, so that feed pipe members 34 of varying lengths may be employed. The lower portion of member 34 is preferably of reduced internal diameter, as at 36, and is provided with longitudinal grooves or flow passages 36ª. Adjacent the upper end of member 34 are substantially horizontally extending web-reinforced arm members 37, preferably two in number, and positioned substantially one hundred twenty degrees apart, see Fig. 1. Through the outer free ends of the arm members are substantially vertical, internally threaded apertures 37ª in which are adjustable threaded compression screws 38 having lock nuts 39. Supported on each of the screws 38 is a spring supporting or abutment member 40 having an axial socket 41 opening upwardly thereinto and receiving the screw 38. Depending from the platform 5 are a plurality of abutment and centering members 42, preferably three in number, which are positioned substantially equidistant from the passage 13 and housing member 4, and which are substantially equidistant from each other such that they are spaced substantially one hundred twenty degrees apart with the line of centers of two of said members being substantially parallel to plate portion 5ª. Supported on each of the members 40 is a coil spring or resilient means 43 which seats at its upper end upon an alined abutment member 42, and which is held under compression therebetween. By removing the springs 43 and rotating the pipe member through one hundred twenty degrees clockwise of Fig. 1, the apparatus may be used on the opposite side of the locomotive upon reinserting the springs between the newly alined pairs of abutment members.

Positioned in the bore of the pipe member 34 is a discharge guiding pin member 44 which is of a diameter substantially equal to the internal diameter of the reduced portion 36 so that members 34 and 44 are substantially relatively rigid. The member 44 projects from the lower end of member 34 and is provided with a substantially conical end 45 operable to engage in the fillet or throat between the face and flange of a wheel. The member 44 is adjustably locked or held in member 34 by means of a detent or pin member 46. On the member 34 substantially midway of the length of portion 36, is a substantially cylindrical externally threaded extension 47 having a substantially cylindrical bore 48 opening through the wall of member 34 transverse to the axis of member 34. Positioned in bore 48 is the detent member 46 which has a substantially conical inner end which seats in any one of a plurality of transverse apertures 49 through member 44, so that wear of member 44 may be readily taken up. Surrounding the member 46 within bore 48, is a coil spring 50 which seats on a shoulder 51 of member 46 and is held under compression thereagainst by a cap member 52 threaded on the extension 47, and apertured, as at 53, for passage of the outer end of member 46. The free outer end of member 46 preferably has an annular abutment 54 thereon, such as a split washer, to prevent the member 52 from being forced off member 46 when the cap member is unscrewed to release the member 44 for adjustment.

The operation of my device is as follows: The device is operatively positioned with respect to fillet or wheel throat by fixing the bracket 2 so that the outside face thereof will be flush with or in the plane of the inside face of the wheel, so that the pin 44 will be substantially seven-eighths of an inch out of plumb in a forward direction, and so that the tip of point 45 will be in a line inclined forward and upward at substantially twenty two and one-half degrees from the horizontal center line of the wheel axis. The springs 43 are placed under sufficient compression by the screws 38 to maintain the point 45 in position, and the inlet passage 31 is connected, as at 55, to a source of lubricant under pressure, which is only operative to supply lubricant during running of the locomotive. The screw 28 is adjusted to determine the pressure at which the valve 16 will open in response to pressure of the lubricant on the under side of diaphragm 24. When the pressure of the lubricant in the inlet compartment 10 reaches that pressure for which the valve is set to open, the diaphragm will be moved upward, compressing spring 30 and permitting spring 18 to expand and lift the valve from its seat. Oil will now flow through the passage 13 into the bore of pipe member 34, through grooves 36ª and trickle down the projecting part of pin member 44 to the point of application at the wheel fillet. It may be noted that due to the rotation of the wheel and the point of application of the oil, the oil will flow outwardly on the wheel flange and not appear on the wheel tread.

What I claim and desire to secure by Letters Patent of the United States is:

1. A lubricating device of the character described, comprising a supporting member, a casing having an internal chamber and carried by said supporting member, a partition member in said chamber dividing the same into inlet and outlet compartments and having an aperture therethrough, a valve member cooperable with said aperture for controlling flow through said casing, a diaphragm member closing one side of said inlet compartment and engaging said valve member, resilient means normally urging said valve member toward open position, means resisting operation of said diaphragm member in response to pressure in said inlet compartment and normally acting to maintain said valve member in closed position, an inlet to said inlet compartment, a feed pipe member carried by said casing and communicating with said outlet compartment, a discharge guiding pin member secured in the bore of said pipe member and projecting therefrom for engagement with the part to be lubricated, and means operable to hold said pin member in engagement with the part to be lubricated.

2. A lubricating device of the character described, comprising a supporting member, a hollow casing member carried by said supporting member and having an inlet and an outlet, a feed pipe member carried by said casing member and communicating with said outlet, a discharge guiding pin member secured in the bore of said pipe member and projecting therefrom for engagement with the part to be lubricated, said supporting member having depending laterally spaced abutment members offset from said casing member, arm members carried by said pipe member and underlying said abutment members, adjustable abutment members carried by said arm members, and coil spring members centered by and positioned between said first-named abutment members and said second-named abutment members whereby to urge said pin member into engagement with the part to be lubricated.

3. A lubricating device of the character described, comprising a supporting member, a hollow casing member carried by said supporting member and having an inlet and an outlet, a feed pipe member universally mounted on and depending from said casing member and communicating with said outlet, a discharge guiding pin member secured in the bore of said pipe member and projecting therefrom for engagement with the part to be lubricated, depending abutment members carried by said supporting member, said abutment members being positioned substantially equidistant from said pipe member and being spaced substantially equidistant from each other, a pair of arm members carried by said pipe member and underlying certain of said abutment members, and coil spring members centered by and engaging said certain abutment members and interposed between said certain abutment members and said arm members whereby to urge said pipe member in one direction, said pipe member being rotatable to position said arm members under a certain other pair of said abutment members whereby the interposed spring members will urge said pipe member in another direction.

4. A lubricating device of the character described, comprising a plate member having a marginal supporting flange adapted to be secured to a support, a casing member positioned centrally of said plate member and having an internal chamber with an opening in its underside, abutment members depending from the underside of said plate member, said abutment members being spaced substantially equally from said casing member and from each other, a feed pipe member secured in said opening, said pipe member having spaced arms with upward directed abutment members, coil spring members held under compression between said plate member and said arms and being centered by said abutment members, a discharge guiding pin member fixed in said pipe member and projecting therefrom, said spring members normally acting to urge said pin member into engagement with the part to be lubricated, a partition in said chamber, said partition having an aperture therethrough, and a valve in said chamber cooperable with said aperture to control flow to said feed pipe member.

5. A lubricating device of the character described, comprising a supporting member, a hollow casing member carried by said supporting member and having an inlet and an outlet, a feed pipe member universally mounted on and depending from said casing member and communicating with said outlet, a discharge guiding pin member secured in the bore of said pipe member and projecting therefrom for engagement with the part to be lubricated, said supporting member having three spring centering means spaced from each other and from said pipe member, said pipe member having two spring centering means spaced from each other and adapted to underlie and cooperate with one pair of said first-named centering means, and helical coil springs held under compression by and between said supporting member and said pipe member and each having its opposite ends centered by said centering means whereby said springs serve to normally urge said pipe member in one direction, said pipe member being rotatable to position said second-named centering means under another pair of said first-named centering means whereby the interposed springs will urge said pipe member in another direction.

6. A lubricating device, comprising a supporting member, a lubricant feed pipe depending therefrom, a discharge guiding pin projecting from the bore of said pipe, said pipe having an aperture through its side wall, a hollow open-ended extension surrounding said aperture and projecting from said pipe, said pin having a plurality of longitudinally spaced apertures registerable with said pipe aperture, a detent member positioned in said extension and having a head engageable in said pin apertures to hold said pin against longitudinal movement, a closure member for the outer end of said extension and having an aperture therethrough, said detent member having a stem extending through said closure member aperture, and a helical coil spring surrounding said stem and held under compression by said closure member whereby to urge said head into its pin aperture.

7. A lubricating device, comprising a supporting member, a lubricant feed pipe depending therefrom, a discharge guiding pin projecting from the bore of said pipe, said pipe having an aperture through its side wall, a hollow open-ended extension surrounding said aperture and projecting from said pipe, said pin having a plurality of longitudinally spaced apertures registerable with said pipe aperture, a detent member positioned in said extension and having a head engageable in said pin apertures to hold said pin against longitudinal movement, a closure member for the outer end of said extension and having an aperture therethrough, said detent member having a stem extending through said closure member aperture, a helical coil spring surrounding said stem and held under compression by said closure member whereby to urge said head into its pin aperture, and means to prevent disengagement between said detent member and said closure member.

8. A lubricating device comprising a bracket member, a supporting plate projecting laterally from said bracket member, a valve casing depending from said supporting plate, a valve member controlling flow through said casing, a feed pipe universally supported by and depending from said casing, a discharge guiding pin projecting from said pipe, and a plurality of coil springs positioned laterally of said valve casing, said springs being held under compression between said plate and said pipe and acting to urge said pin laterally into engagement with a part to be lubricated.

ADOLF von WANGENHEIM.